UNITED STATES PATENT OFFICE.

CHARLES M. HIGGINS, OF NEW YORK, N. Y.

PROCESS OF DIGESTING STARCH.

SPECIFICATION forming part of Letters Patent No. 642,330, dated January 30, 1900.

Original application filed December 31, 1898, Serial No. 700,837. Divided and this application filed April 13, 1899. Serial No. 712,879. (No specimens.)

*To all whom it may concern:*

Be it known that I, CHARLES M. HIGGINS, a citizen of the United States, residing at New York, (Brooklyn,) in the county of Kings and State of New York, have invented a certain new and useful Improvement in Digesting Starch and in the Manufacture of Adhesive Compounds, of which the following is a specification.

This invention embodies a new process for digesting or partly digesting starch for the manufacture of adhesive pastes or for making other products of digested starch, whether in the dextrine stage or in a stage previous to or subsequent to dextrine.

The present invention has some relation to my former patent, No. 579,827, of March 30, 1897, but is an improvement thereon, and this application is a division of my application filed December 31, 1898, Serial No. 700,837.

The main feature of my present process lies in the special manner in which the digestion of the starch is conducted. Where the digestion is conducted, as heretofore, mainly at a temperature above the jellifying-point of the starch, a very stiff pasty mass is formed, when the previously milky starchy mixture stiffens at the jellifying temperature between 150° and 165° Fahrenheit. This stiff paste or jelly is a very poor conductor of heat and the heat penetrates it very slowly and irregularly, and the stiff mass requires vigorous stirring to equalize the heating and digesting action, which is a difficult and laborious operation. Where the starchy mixture is not more dense than four pounds to the gallon of water, as the preferred formula in my Patent No. 579,827, of March 30, 1897, and where the conversion is not carried far or into the dextrine stage and is not so long continued, this stage of the stiff paste or jelly, although presenting difficulties, is not so serious as it would be in the case where a much denser mixture is used—viz., from five to six or more pounds of starch to the gallon of water—and where the digestion is carried much farther, as I prefer to do in the present complete process. I obviate this difficulty entirely, however, by conducting the digestion at a temperature below the jellifying-point of the starch during the state of what is known as "starch-milk" or "starch-cream," and I thus continue the digestion until the starch has lost its jellifying quality and becomes non-gelatinous or nearly so. I then raise the temperature above the normal jellifying-point, so that the now converted or non-gelatinous starch will then rapidly melt or liquefy into a more or less fluent syrup or syrupy liquid without passing through the stage of a stiff inert gelatinous paste at all, and I then continue the digestion and liquefaction to any required degree. By this method I greatly facilitate the process of converting or dissolving the starch, and thereby produce a paste or other product of much better and more uniform qualities than heretofore possible, as hereinafter fully set forth.

In describing the practical working of my invention I will first give a model or preferred formula with the preferred proportions and kind of ingredients for producing the most preferred product of this invention.

To one gallon or eight pounds of water add one fluid ounce of muriatic or equivalent acid and preferably three ounces avoirdupois of boracic acid, and when these acids are fully mixed or dissolved in the water add five to six pounds of raw powdered starch, preferably corn-starch, and mix the same together thoroughly, so as to produce a uniform milky mixture. I generally prefer to have the acid water heated to about 150° or 155° when the starch is added; but the acid water may be cold, if desired, when the starch is added and the heat applied subsequently. The mixture of starch and acidulated water should be kept stirred or agitated to prevent the settling of the starch, and at the same time heat should be applied to raise the temperature of the mixture. The heating and stirring should be continued until a temperature near to, but below, the full jellifying-point of the starch is reached—say between 150° to 165° Fahrenheit. I generally prefer a limiting temperature of about 150° to 155°, or just where the starch-milk begins to thicken into a starch-cream, but does not actually jellify. When this point is reached, I arrest the heat and keep the mass at or near that temperature for some time—say from one-half to one hour or more, according to circumstances. During this time and at this temperature conversion or digestion of the starch will go on continuously and effectively, so that at the end of the half-hour or more it will be found that the starch will have become soluble and have lost its jellifying power without ever having entered the stiff pasty or gelatinous condition at all, which it would do were the digesting temperature carried to or above the jellifying-point at the outset. Hence as soon as this digested condition is reached I then raise the temperature above the jellifying-point, when the creamy starchy mass will immediately melt or liquefy without passing through the stiff rubbery pasty stage and will then assume different successive degrees of liquidity as the temperature rises. The length of time necessary to effect this change will of course vary according to the size of the mass acted on, the quantity and temperature of the heat applied, the density of the starch mixture, and the strength of acid or digesting solution, as chemists will readily understand; but a period of one-half hour to one hour near or at the jellifying temperature will generally be sufficient in all cases to render the starch non-gelatinous and capable of complete and immediate liquefaction as soon as the temperature is raised above this point. In the formula given when the temperature reaches 170° the consistency of the solution will usually be a liquid opalescent jelly. When it reaches 180° to 185°, it will be quite liquid and at about 190° very liquid. It will generally not be necessary to heat the solution above 195° or 200° unless very dense solutions are used or liquid products are required. The digestion can be carried to and arrested at any stage, according to the nature of the product desired; but if a pure white dextrine paste is desired I continue the digestion past both what I term the "glutinous stage" and the "soluble stage" into the stage of white dextrine before I arrest this action. To do this, it will be necessary to continue the digesting action at a temperature from about 180° to 195° for some minutes or until the digestion has so advanced that the blue reaction with iodin completely disappears and a distinct reddish or purple coloration shows with the iodin test. When this point is reached, the heat is stopped and the digestion arrested, and the acid is then neutralized. For this purpose I prefer to use in the formula given one and one-half fluid ounces of caustic-soda lye at 40° Baumé, which will more than neutralize the amount of acids used and will give the mixture a slight alkaline reaction, which is generally preferred. The neutralized liquid is then run into jars or other receptacles and allowed to cool and set into a soft pasty form. When thus cooled and set, the product will be a very pure white paste of a soft unctuous pulpy consistency, spreading very smoothly and easily, having little tendency to strike into or warp the paper, with a great adhesive power, quick to adhere, and quick to dry; and one great advantage of this system is that the paste made by this process from corn-starch entirely will be equal to or superior to the pastes made from pure potato dextrine by the old process and at about one-half the cost, which is the most important advance in the art. Another great advantage is that the product will be much more uniform in color, consistency, and adhesive qualities than is possible with pastes made from either corn or potato dextrines by the old processes. By the old process, using dry dextrine, it has not been possible to make a pure white unctuous paste from corn dextrine, whereas by this process I can make such a paste entirely from corn-starch, which is superior in color, consistency, and adhesiveness to that made from the more expensive white potato dextrine.

It may be observed that the great advantage of starting the digestion below or at the jellifying-point and continuing it until the starch loses its gelatinous quality and then finishing the digestion is that much more uniform digesting action is obtained, as the whole mass is acted upon uniformly at once, the temperature and chemical action being uniform throughout the mass, far less power is required to stir the mass, and very dense solutions can be worked without difficulty, and the time for completing the process is reduced, and the product of each lot is rendered uniform in color, consistency, and adhesive qualities, which combined result has been a great desideratum.

It will be noted that I prefer the first stage of the digestion be conducted at a temperature near to, but below, the jellifying-point of the starch; but I wish to here note that it will be no evasion of my invention to carry this digesting temperature actually as far as the jellifying-point or slightly above, so that the whole mass will then actually stiffen, provided the heat is then practically arrested and the digestion goes on at this point until the starch becomes non-gelatinous, or nearly so, after which the temperature may be raised and the mass liquefied. It will be noted that by arresting the heat partly or entirely at or near the jellifying-point necessity for stirring the stiff mixture is obviated and the heat already contained in the mass does the work of digestion in a uniform manner, and I obviate the irregular action of a continued and higher heat, which if applied at this stage would cause one part to become a bubbling liquid while the rest was an inert cold and solid mass, which is very objectionable and which objection my novel process entirely obviates.

A greater density than five or six pounds to the gallon of water may be used for some special pastes; but in such cases I prefer to carry the digestion a little farther than the first dextrine stage, so that the color reaction with iodin will be a very reddish purple, but still well within the dextrine range; but for most purposes the range of a little less than five pounds or from four and one-half up to six pounds will produce the best results in dextrine pastes.

I prefer to conduct the first stage of the digestion as described at a temperature near to, but below, the jellifying-point—say 145° to 155° Fahrenheit; but a much lower temperature than this can be used, if desired. If, however, a lower temperature is used, a longer time or more acid will be required for the digestion or to render the starch non-gelatinous, and vice versa, as will be understood.

Of course I do not limit myself to any particular kind of acid or digesting agent employed, nor to any kind of neutralizing substance, nor to any exact amount of the digesting or neutralizing agents, which may be increased or diminished. In some cases the neutralizing substance may be omitted where a slight trace of acid in the paste will not be objectionable.

It will not be necessary in all cases to cool the digested starch solution into the pasty form, as the solution may be retained in the hot liquid stage at the proper digested point, after which the temperature may be reduced somewhat and then used for some special purpose while still hot and liquid, as will be understood.

The particular manner of conducting the digestion in two steps—viz., first, at, near, or below the jellifying-point and then, finally, above the jellifying-point—which constitutes the main feature of my invention and the main subject of this divisional application, is not, of course, limited to any special proportion or density of ingredients nor to any particular stage to which the digestion may be carried or at which it may be arrested, whether in the glutinous, soluble dextrine, or other stages, as this process can be used in the manufacture of any product of starch digestion, as will be readily understood.

What I claim as new is—

1. The process of converting starch herein set forth, viz., digesting the starch in water impregnated with a digesting acid or agent at a temperature below or near the jellifying-point of the starch and continuing the action until the starch becomes non-gelatinous or nearly so, substantially as and for the purpose set forth.

2. The novel process of converting starch herein set forth, viz., digesting the starch in a digesting fluid at a temperature below or near the jellifying-point of the starch until it becomes non-gelatinous or nearly so, then raising the temperature above the jellifying-point and liquefying the mixture, substantially as and for the purpose set forth.

3. The described process of converting starch, consisting in digesting the starch in a digesting fluid at a temperature below or near the jellifying-point of the starch until it becomes non-gelatinous or nearly so, then raising the temperature and liquefying the mixture, and then neutralizing the same, substantially as herein set forth.

4. The novel process of producing an adhesive paste or product of digested starch herein set forth, viz., digesting starch in a digesting fluid at a temperature below or near the jellifying-point until the starch becomes non-gelatinous or nearly so, then liquefying the mixture, and then cooling said mixture, substantially as herein set forth.

5. The novel process of producing an adhesive paste or product of digested starch herein described, viz., digesting starch in acidulated water at a temperature below or near the jellifying-point until it becomes non-gelatinous or nearly so, then liquefying the mixture, then neutralizing the acid and finally cooling the neutralized mixture, substantially as herein set forth.

6. The novel process of converting starch herein described, viz., digesting the starch in hot water impregnated with a digesting agent at a temperature about 145° to 155° Fahrenheit until the starch becomes non-gelatinous or nearly so, then raising the temperature above that of the first or digesting stage and liquefying the mixture, substantially as and for the purpose set forth.

7. The specific process of making an improved dextrine paste herein described, viz., digesting starch in a digesting fluid at a temperature below or near the jellifying-point until the starch becomes non-gelatinous or nearly so, then liquefying the mixture and continuing the action until the starch becomes converted into dextrine, and then arresting the solution in said state, substantially as herein set forth.

In testimony whereof I affix my signature, in the presence of two witnesses, this 12th day of April, 1899.

CHAS. M. HIGGINS.

Witnesses:
JNO. E. GAVIN,
WALTER E. CLENDANIEL.